United States Patent
Zhang et al.

(10) Patent No.: US 7,689,055 B2
(45) Date of Patent: Mar. 30, 2010

(54) METHOD AND APPARATUS FOR ENHANCING IMAGE ACQUIRED BY RADIOGRAPHIC SYSTEM

(75) Inventors: Li Zhang, Beijing (CN); Zhiqiang Chen, Beijing (CN); Yuxiang Xing, Beijing (CN); Yuanjing Li, Beijing (CN); Yinong Liu, Beijing (CN); Ziran Zhao, Beijing (CN); Yongshun Xiao, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 952 days.

(21) Appl. No.: 11/472,193

(22) Filed: Jun. 21, 2006

(65) Prior Publication Data

US 2006/0291742 A1 Dec. 28, 2006

(30) Foreign Application Priority Data

Jun. 27, 2005 (CN) .................... 2005 1 0077797

(51) Int. Cl.
*G06K 9/40* (2006.01)
(52) U.S. Cl. .................. 382/254; 382/266; 382/132
(58) Field of Classification Search ............... 382/266, 382/199, 132; 358/327
See application file for complete search history.

(56) References Cited

U.S. PATENT DOCUMENTS

| | | | | | |
|---|---|---|---|---|---|
| 4,794,531 | A | * | 12/1988 | Morishita et al. | 382/132 |
| 4,903,205 | A | * | 2/1990 | Hishinuma | 382/130 |
| 4,945,502 | A | * | 7/1990 | Kwon et al. | 382/275 |
| 5,081,692 | A | * | 1/1992 | Kwon et al. | 382/263 |
| 5,903,660 | A | * | 5/1999 | Huang et al. | 382/132 |
| 6,118,906 | A | * | 9/2000 | Keyes et al. | 382/266 |
| 6,381,351 | B1 | * | 4/2002 | Powell | 382/131 |
| 6,621,595 | B1 | * | 9/2003 | Fan et al. | 358/3.26 |
| 6,628,842 | B1 | * | 9/2003 | Nagao | 382/266 |
| 2003/0161548 | A1 | * | 8/2003 | Vuylsteke | 382/274 |
| 2008/0101716 | A1 | * | 5/2008 | Ho | 382/266 |

* cited by examiner

*Primary Examiner*—Wesley Tucker
*Assistant Examiner*—Mark Roz
(74) *Attorney, Agent, or Firm*—Kinney & Lange, P.A.

(57) ABSTRACT

A method of image information enhancement in radiography relates to image information processing techniques in radiography. The method comprising steps of: normalizing an acquired image $A(x,y)$ to form a normalized image $B(x,y)$; filtering the normalized image $B(x,y)$ by a low-pass filter to obtain an filtered image $C(x,y)$; calculating a relative standard deviation for each pixel in the image $A(x,y)$, three times the relative standard deviation being an edge threshold for each pixel; thresholding a difference image obtained by subtracting the filtered image $C(x,y)$ from the normalized image $B(x,y)$ by using the edge threshold for each pixel to form a threshold-processed image $D(x,y)$; enhancing a contrast of the threshold-processed image $D(x,y)$ by using a non-linear function to form a contrast-enhanced image $E(x,y)$; determining a enhancement coefficient $a(x,y)$; obtaining a edge-enhanced image $F(x,y)$ by multiplying the enhancement coefficient $a(x,y)$, the contrast-enhanced image $E(x,y)$ and the filtered image $C(x,y)$; and generating a resulting image by multiplying a sum of the edge-enhanced image $F(x,y)$ and the filtered image $C(x,y)$ with the maximum value $A_{max}$ As compared with the prior arts, the inventive method has a fast processing speed for image information enhancement and a simple algorithm, images clearly, eliminates noises in the images, and satisfies the requirements of relatively more enhancement to the contrast of the dark regions in the scanned images.

5 Claims, 3 Drawing Sheets

METHOD AND APPARATUS FOR ENHANCING IMAGE ACQUIRED BY RADIOGRAPHIC SYSTEM

BACKGROUND OF THE INVENTION

1. Field of Invention

The present invention relates to image information processing techniques in radiography, and more particularly to a method for enhancing image information in radiography.

2. Description of Prior Art

Radiographic technique is now widely used in industrial Nondestructive Detections (NDTs), medical diagnoses and science researches. The basic principle of radiography is that different absorptivities of different materials to X rays are used for forming different gradation values of pixels in a scanned image acquired by X rays penetrated an object. The energy of rays is exponentially attenuated when the thickness of the object to be scanned increases. Therefore, the difference among gradation values for border contours of a scanned image of a thicker object is much less than that of a thinner one, that is to say, the contours inside the object will be more blurred with increasing of the thickness of the object to be scanned. In the scanned image, it is represented by low sharpness of the difference in gradation values for a dark region. Furthermore, human's eyes have lower resolving capability for contours in a dark region than that for contours in a bright region. Thus, the image for objects in the dark region is not clear. Therefore, there is a need for enhancing the contrast of the scanned images.

Presently, processes for enhancing image information mainly include gradation transformation, histogram equalization, border enhancement and the like. The gradation transformation method and the histogram equalization method both use the dot operation rules. So-called dot operation refers to mapping an input image into an output image wherein each pixel dot in the output image is only determined by the value of the corresponding input pixel dot. The dot operation is generally used for changing the gradation range and distribution, and is an important tool for image digitalization and image display. During enhancing the contrast of the scanned images, conventional dot operation does not consider the influence on a certain pixel by its neighborhood, but simply maps one gradation value onto another gradation value. Such a procedure impairs one gradation range while enhancing another gradation range, typically, such as logarithm transformation and exponent transformation. An edge enhancement method is also referred to as sharpening, and the object thereof is to clarify edges of images in order to recognize and process a target. The existing methods include gradient method, Laplacian operator and high-pass filtering etc. The final object of these processing methods is to make images clearer, and to make details apparent. When enhancing the contrast of scanned images, the edge enhancement method directly detects edges of an image, and enhances the contrast of the detected edges, in which a ratio of enhancement is generally constant. On one hand, such a processing method has to enhance the noises in images. On the other hand, the enhancement to weak edges in the dark regions is relatively small, which can not satisfy the requirements of relatively more enhancement to the contrast of the dark regions in the scanned images.

SUMMARY OF THE INVENTION

In view of the above drawbacks in the prior arts, it is an object of the present invention to provide a method for enhancing image information in radiography, which may contrast-enhance edge details of various gradation regions in an image in a whole while eliminating image noises, and especially, increase an enhancement amplitude of weak edges in dark regions, in order to achieve a clear scanned image.

For achieving the above object, the technical solution of the present invention will be implemented as follows.

In one aspect of the invention, a method for enhancing an image acquired by a radiographic system comprising the steps of: normalizing an acquired image A(x,y) to form a normalized image B(x,y); filtering the normalized image B(x,y) by a low-pass filter to obtain an filtered image C(x,y); calculating a relative standard deviation for each pixel in the image A(x,y), three times the relative standard deviation being an edge threshold for each pixel; thresholding a difference image obtained by subtracting the filtered image C(x,y) from the normalized image B(x,y) by using the edge threshold for each pixel to form a threshold-processed image D(x,y); enhancing a contrast of the threshold-processed image D(x,y) by using a non-linear function to form a contrast-enhanced image E(x,y); determining a enhancement coefficient a(x,y) for each pixel as below:

$$a(x, y) = \frac{c}{\sqrt{\frac{A(x, y)}{A_{max}}}},$$

wherein c is a predetermined constant, $A_{max}$ is the maximum value of pixel in the image A(x,y);

obtaining a edge-enhanced image F(x,y) by multiplying the enhancement coefficient a(x,y), the contrast-enhanced image E(x,y) and the filtered image C(x,y); and generating a resulting image by multiplying a sum of the edge-enhanced image F(x,y) and the filtered image C(x,y) with the maximum value $A_{max}$.

According to an embodiment of the invention, the low-pass filter is an adaptive average filter.

According to an embodiment of the invention, a width of a filtering window of the adaptive average filter increases or decreases as noises in the image increase or decrease.

According to an embodiment of the invention, the thresholding step comprises the steps of: comparing each pixel in the difference image with respective edge threshold; and setting the pixel value as zero in the case of the pixel value is less than the edge threshold.

According to an embodiment of the invention, the non-linear function is a sine function.

According to an embodiment of the invention, the relative standard deviation is calculated as below:

$$\sigma(x, y) = \sqrt{\left\{ \sum_{i,j=-\frac{N}{2}}^{\frac{N}{2}} [A(x_i, y_j) - M(x, y)]^2 \right\} / (N^2 - 1)}$$

wherein M(x,y) is an average value of pixel neighborhood for a pixel (x,y), N denotes a width of pixel neighborhood.

In another aspect of the invention, an apparatus for enhancing an image acquired by a radiographic system comprising: means of normalizing an acquired image A(x,y) to form a normalized image B(x,y); means of filtering the normalized image B(x,y) by a low-pass-filter to obtain an filtered image C(x,y); means of calculating a relative standard deviation for each pixel in the image A(x,y), three times the relative standard deviation being an edge threshold for each pixel; means of thresholding a difference image obtained by subtracting the filtered image C(x,y) from the normalized image B(x,y) by using the edge threshold for each pixel to form a threshold-processed image D(x,y); means of enhancing a contrast of the threshold-processed image D(x,y) by using a non-linear function to form a contrast-enhanced image E(x,y); means of determining a enhancement coefficient a(x,y) for each pixel as below:

$$\alpha(x, y) = \frac{c}{\sqrt{\frac{A(x, y)}{A_{max}}}},$$

wherein c is a predetermined constant, $A_{max}$ is the maximum value of pixel in the image A(x,y);

means of obtaining a edge-enhanced image F(x,y) by multiplying the enhancement coefficient a(x,y), the contrast-enhanced image E(x,y) and the filtered image C(x,y); and means of generating a resulting image by multiplying a sum of the edge-enhanced image F(x,y) and the filtered image C(x,y) with the maximum value $A_{max}$.

With the above technical solution, the present invention performs the enhancement process to images by using an adaptive non-linear contrast enhancement method. The adaptivity is characterized in that edge details of various gradation regions in an image are contrast-enhanced in a whole while eliminating image noises, and enhancement amplitude is increased at weak edges in dark regions, so as to make the scanned images clearer. As compared with the prior arts, the inventive method has a fast processing speed for image information enhancement and a simple algorithm, images clearly, eliminates noises in the images, and satisfies the requirements of relatively more enhancement to the contrast of the dark regions in the scanned images. The present invention is applicable to a processing system of image information enhancement with large data processing amount and high real-time requirements.

The present invention will be further explained with reference to the drawings and embodiments.

DETAILED DESCRIPTION OF PREFERRED EMBODIMENTS

Figure 1:
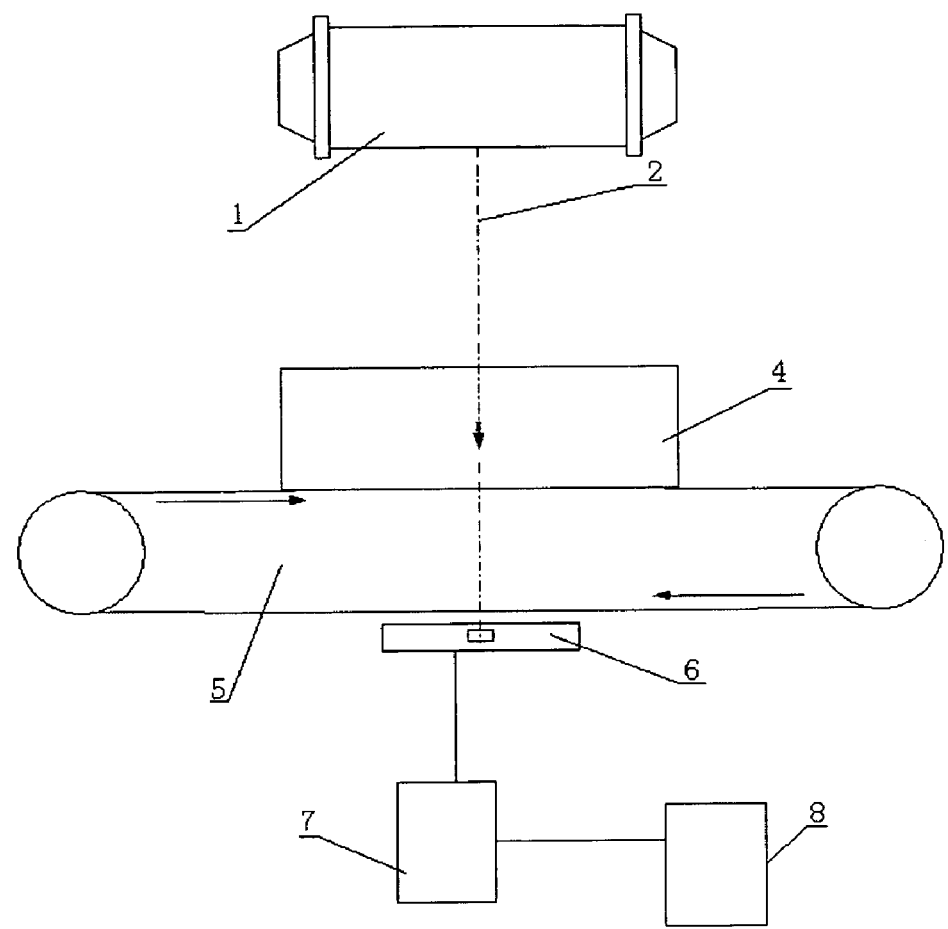
FIG. 1 is diagram showing the structure of the radiographic system which provides a signal source for the method according to the present invention.

The inventive method is used for processing a signal obtained by a radiographic system. As shown in FIG. 1, the radiographic system includes a radiation source 1, a mechanical control device 5, a detector device 6, a data acquisition device 7 and a computer imaging device 8. The radiation source 1 emits X rays 2 which penetrate through an object to be detected 4 being carried by the mechanical control device 5, and then are received by the detector device 6 facing the X rays 2. The received X rays signal is transmitted from the detector device 6 to the data acquisition device 7, and after being converted into a digital signal, is transferred to the computer imaging device 8.

Figure 2:
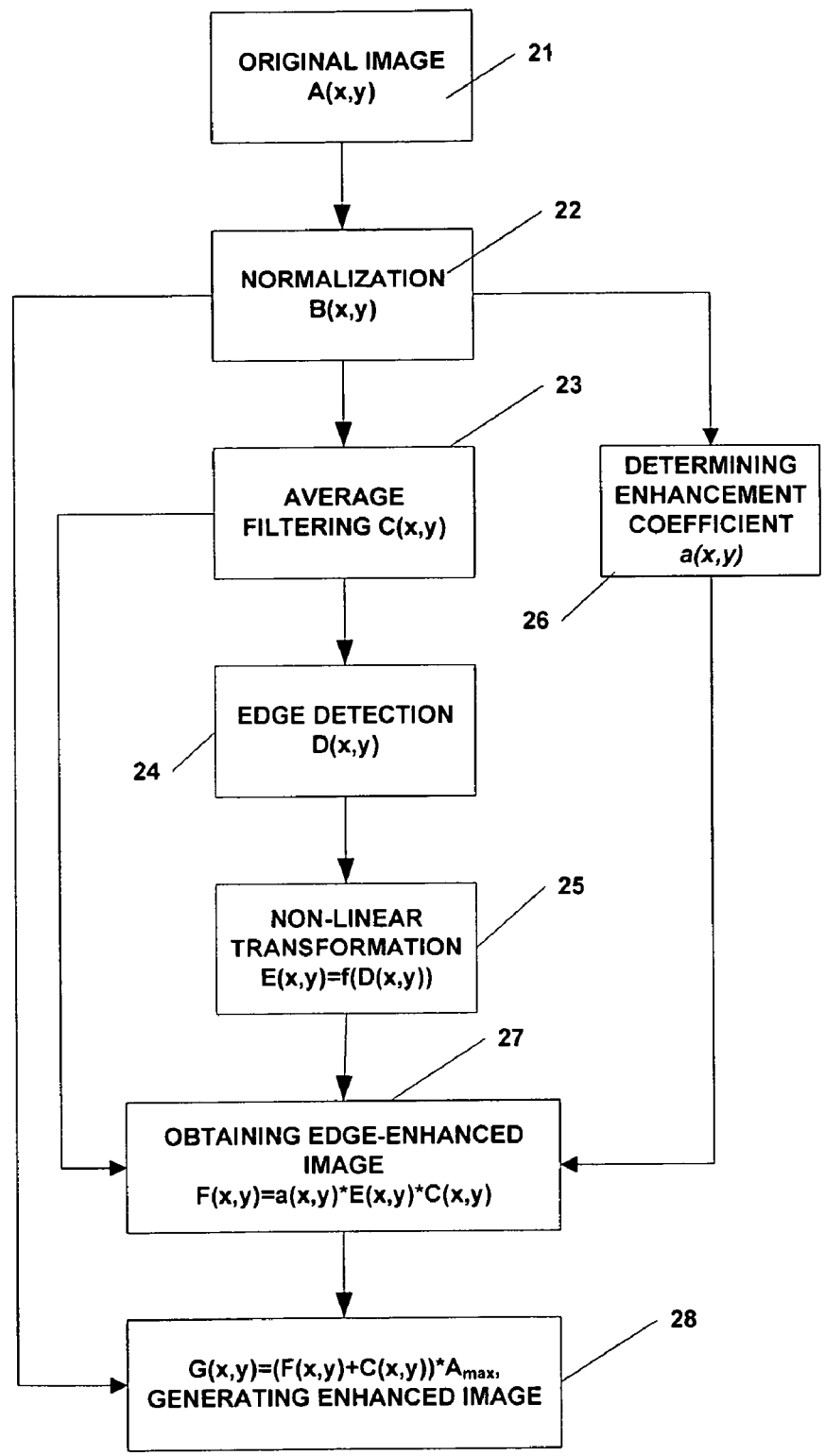
FIG. 2 is a flowchart showing the operation steps according to the present invention.

Referring to FIG. 2, the main steps of the inventive method are described as follows.

At block 21, a radiation image A(x,y) of the object to be detected is obtained through the radiographic system.

At block 22, a maximum value of pixel gradations $A_{max}$ is found in the image A(x,y). Then, the image A(x,y) is normalized so that the pixel gradations of a normalized image B(x,y) distribute within (0, 1), in which the formula for normalization is $$B(x, y) = \frac{A(x, y)}{A_{max}}.$$

At block 23, an average filtering process is performed to the normalized image B(x,y) to obtain an filtered image C(x,y). When the average filtering process is performed, a width of a filtering window increases with the increasing of the image noises or decreases with the decreasing of the image noises.

At block 24, a relative standard deviation is calculated for each pixel in the image, and a value 3 times the relative standard deviation is used as an edge threshold for each pixel in the image, in which the formula for calculating the standard deviation is $$\sigma(x, y) = \sqrt{\left\{ \sum_{i,j=-\frac{N}{2}}^{\frac{N}{2}} [A(x_i, y_j) - M(x, y)]^2 \right\} / (N^2 - 1)},$$

wherein M(x,y) is an average value of pixel neighborhood for a pixel (x,y) and N is a width of the pixel neighborhood. Then, the filtered image C(x,y) is subtracted from the normalized image B(x,y), the resultant difference is compared with the edge threshold, and when it is determined larger than the edge threshold, this difference will be saved into an image D(x,y), and otherwise, a value of a corresponding pixel in D(x,y) is set into 0.

Figure 3:
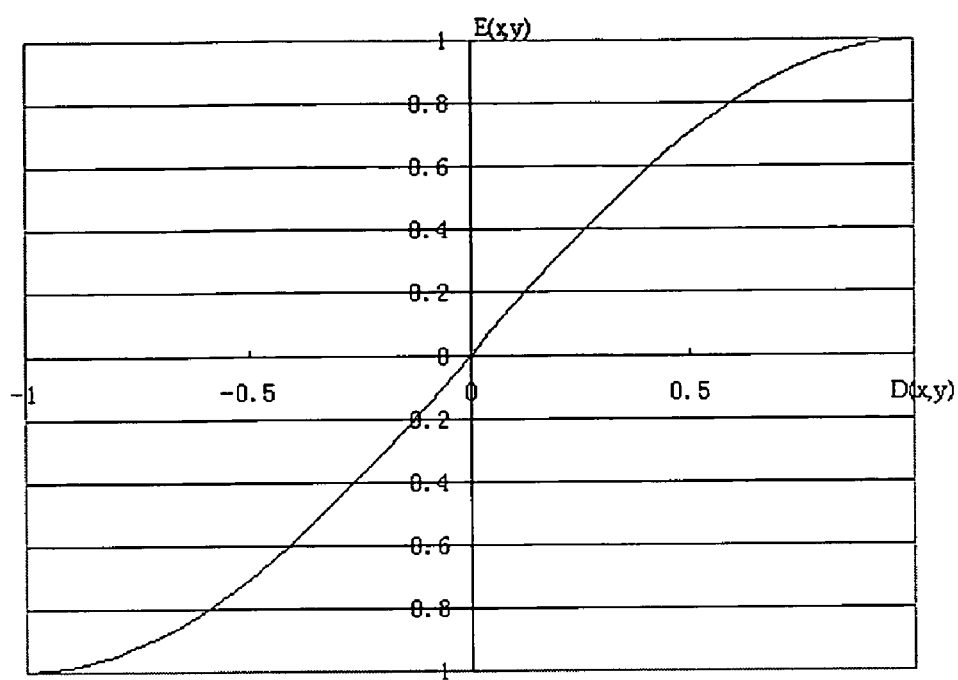
FIG. 3 is a curve graph showing the non-linear contrast enhancement transform according to the present invention.

At block 25, a non-linear contrast enhancement transformation which is in a form of sine transformation is performed to the image D(x,y) to obtain an image E(x,y), as shown in FIG. 3.

At block 26, a constant c larger than 1 is determined to obtain an enhancement coefficient:

$$\alpha(x, y) = \frac{c}{\sqrt{\frac{A(x, y)}{A_{max}}}}.$$

At block 27, the enhancement coefficient α(x,y), E(x,y) and C(x,y) are multiplied to obtain an edge-enhanced image F(x,y)=α(x,y)*E(x,y)*C(x,y).

At block 28, a final enhanced image G(x,y)=(F(x,y)+C(x, y))*$A_{max}$ is achieved.

What is claimed is:

1. A method for operating a radiographic system comprising the steps of:

emitting from X-rays which penetrate through an object to be detected being carried by a mechanical control device;

receiving by a detector device the X rays and transmitting the received signal from the detector device to a data acquisition device;

converting the signal into a digital signal and transferring the digital signal to a computer imaging device;

the method further comprising the steps of, at the computer imaging device;

normalizing an acquired image A(x,y) to form a normalized image B(x,y);

filtering the normalized image B(x,y) by a low-pass filter to obtain an filtered image C(x,y);

calculating a relative standard deviation for each pixel in the image A(x,y), three times the relative standard deviation being an edge threshold for each pixel, wherein the relative standard deviation is calculated as below:

$$\sigma(x, y) = \sqrt{\left\{ \sum_{i,j=-\frac{N}{2}}^{\frac{N}{2}} [A(x_i, y_j) - M(x, y)]^2 \right\} / (N^2 - 1)}$$

wherein M(x,y) is an average value of pixel neighborhood for pixel (x,y), and N denotes a width of pixel neighborhood;

subtracting the filtered image C(x,y) from the normalized image B(x,y) to obtained a difference image;

thresholding the difference image using the edge threshold for each pixel to form a threshold-processed image D(x,y);

enhancing a contrast of the threshold-processed image D(x,y) by using a non-linear function to form a contrast-enhanced image E(x,y), wherein the non-linear function is arranged to implement a sine transformation;

determining a enhancement coefficient a(x,y) for each pixel as below:

$$\alpha(x, y) = \frac{c}{\sqrt{\frac{A(x, y)}{A_{max}}}},$$

wherein c is a predetermined constant, Amax is the maximum value of pixel in the image A(x,y);

obtaining a edge-enhanced image F(x,y) by multiplying the enhancement coefficient a(x,y), the contrast-enhanced image E(x,y) and the filtered image C(x,y), and generating a resulting image by multiplying a sum of the edge-enhanced image F(x,y) and the filtered image C(x,y) with the maximum value Amax.

2. The method as set forth in claim 1, wherein the low-pass filter is an adaptive average filter.

3. The method as set forth in claim 2, wherein a width of a filtering window of the adaptive average filter increases or decreases as noises in the image increase or decrease.

4. The method as set forth in claim 1, wherein the thresholding step comprises the steps of:

comparing each pixel in the difference image with respective edge threshold;

saving the pixel value in the case of the pixel value is larger than the edge threshold; and setting the pixel value as zero in the case of the pixel value is less than the edge threshold.

5. A radiographic system comprising:

a radiation source, a mechanical control device, a detector device, a data acquisition device and computer imaging device, the radiation source emits X rays which penetrate through an object to be detected being carried by the mechanical control device, and then are received by the detector device facing the X rays, the received X rays signal is transmitted from the detector device to the data acquisition device, and after being converted into a digital signal, is transferred to the computer imaging device, the computer imaging device being arranged to:

normalize an acquired image A(x,y) to form a normalized image B(x,y);

filter the normalized image B(x,y) by a low-pass-filter to obtain an filtered image C(x,y);

calculate a relative standard deviation for each pixel in the image A(x,y), three times the relative standard deviation being an edge threshold for each pixel, wherein the relative standard deviation is calculated as below:

$$\sigma(x, y) = \sqrt{\left\{ \sum_{i,j=-\frac{N}{2}}^{\frac{N}{2}} [A(x_i, y_j) - M(x, y)]^2 \right\} / (N^2 - 1)}$$

wherein M (x,y) is an average value of pixel neighborhood for a pixel (x,y), N denotes a width of pixel neighborhood;

subtract the filtered image C(x,y) from the normalized image B(x,y) to obtained a difference image;

threshold a difference image by using the edge threshold for each pixel to form a threshold-processed image D(x,y);

enhance a contrast of the threshold-processed image D(x,y) by using a non-linear function to form a contrast-enhanced image E(x,y), wherein the non-linear function is arranged to implement a sine transformation;

determine a enhancement coefficient a(x,y) for each pixel as below:

$$\alpha(x, y) = \frac{c}{\sqrt{\frac{A(x, y)}{A_{max}}}},$$

wherein c is a predetermined constant, Amax is the maximum value of pixel in the image A(x,y);

obtain a edge-enhanced image F(x,y) by multiplying the enhancement coefficient a(x,y), the contrast-enhanced image E(x,y) and the filtered image C(x,y) and generate a resulting image by multiplying a sum of the edge-enhanced image F(x,y) and the filtered image C(x,y) with the maximum value Amax.

* * * * *